United States Patent [19]
Akao et al.

[11] Patent Number: 4,876,125
[45] Date of Patent: Oct. 24, 1989

[54] GUSSET BAG FOR PHOTOGRAPHIC PHOTOSENSITIVE MATERIALS

[75] Inventors: Mutsuo Akao; Hiroyuki Osanai; Koji Inoue, all of Kanagawa, Japan

[73] Assignee: Fuji Photo Film Co., Ltd., Kanagawa, Japan

[21] Appl. No.: 222,783

[22] Filed: Jul. 22, 1988

[30] Foreign Application Priority Data

Jul. 22, 1987 [JP] Japan .............................. 62-181188

[51] Int. Cl.[4] ...................... B65D 85/00; B32B 27/04

[52] U.S. Cl. .................................. 428/35.2; 206/455; 383/88; 383/90; 428/130; 428/194; 428/195; 428/214; 428/507; 428/516

[58] Field of Search .................. 206/455; 383/88, 90; 428/35.2, 214, 194, 195, 124, 130, 347, 349, 507, 516

[56] References Cited

U.S. PATENT DOCUMENTS

| | | | |
|---|---|---|---|
| 4,147,291 | 4/1979 | Akao et al. | 229/55 |
| 4,258,848 | 3/1981 | Akao et al. | 428/218 |
| 4,331,725 | 5/1982 | Akao | 428/220 |
| 4,337,285 | 6/1982 | Akao et al. | 428/201 |
| 4,356,224 | 10/1982 | Akao et al. | 428/338 |
| 4,359,499 | 11/1982 | Akao et al. | 428/513 |
| 4,386,124 | 5/1983 | Akao | 428/336 |
| 4,411,943 | 10/1983 | Akao | 428/513 |
| 4,411,945 | 10/1983 | Akao et al. | 428/216 |
| 4,436,809 | 3/1984 | Akao et al. | 428/211 |
| 4,452,846 | 6/1984 | Akao | 428/220 |
| 4,469,741 | 9/1984 | Akao | 428/214 |
| 4,500,661 | 2/1985 | Lakshmanan | 524/272 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/335 |
| 4,579,781 | 4/1986 | Akao | 428/461 |
| 4,584,234 | 4/1986 | Hirose et al. | 428/323 |
| 4,587,175 | 5/1986 | Akao | 428/219 |
| 4,629,640 | 12/1986 | Akao | 428/216 |
| 4,639,386 | 1/1987 | Akao | 206/316 |
| 4,653,640 | 3/1987 | Akao | 428/200 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/220 |
| 4,708,896 | 11/1987 | Akao | 428/220 |
| 4,730,778 | 3/1988 | Akao et al. | 206/409 |
| 4,780,357 | 10/1988 | Akao | 428/516 |
| 4,784,906 | 11/1988 | Akao | 428/455 |

*Primary Examiner*—Henry F. Epstein
*Assistant Examiner*—James J. Seidleck
*Attorney, Agent, or Firm*—Burns, Doane, Swecker & Mathis

[57] ABSTRACT

A single-sheet gusset bag for photographic photosensitive materials comprising a laminated sheet of which the inner surface layer is a light-shielding polyolefin resin film layer and the outer surface layer is a heat-resistant flexible sheet layer, and having a botom seal portion fixed by a hot-melt adhesive having a softening point by ring and ball method of 75 to 115 C of which the coating amount in the center portion is less than the coating amount of the side portion.

In the gusset bag of the invention, the bottom seal portion can be effectively sealed without incidence of fogging and uneven gloss caused by the heat of the hot-melt adhesive. Since the gusset bag is formed of a single sheet, packaging is readily achieved. The cost of the packaging material is also inexpensive.

3 Claims, 4 Drawing Sheets

GUSSET BAG FOR PHOTOGRAPHIC PHOTOSENSITIVE MATERIALS

BACKGROUND OF THE INVENTION

1. Field of the Invention

This invention relates to a gusset bag for photographic photosensitive materials used for packaging a rolled photographic paper, a roll film, and the like.

2. Description of the Prior Art

Gusset bags are widely utilized as packaging bags for packaging various things. It is known that gusset bags can be made of paper, thermoplastic resin film and laminated sheet including a combination of a paper layer disposed on the outside and a thermoplastic resin film layer disposed on the inside so as to be heat-sealable (Japanese Patent KOKOKU Nos. 30177/1981 and 54030/1983. Japanese Utility Model KOKOKU No. 3789/1982, etc.). The sealing of the lower end of the bag using an adhesive tape is also known (Japanese Patent KOKAI No. 575/1981).

On the other hand, photographic photosensitive materials such as rolled photographic paper are necessarily packaged in a packaging bag capable of exhibiting moistureproofness and sufficient physical strength while effectively shielding light since photographic photosensitive materials lose their value upon exposure to light. Therefore, the conventional gusset bag for photographic photosensitive materials is a double-sheet gusset bag composed of two packaging materials, i.e. having an inner sheet and an outer sheet, as shown in FIG. 11. The outer sheet A is composed of an unbleached kraft paper 15 and a light-shielding thermoplastic resin film layer 6a laminated thereto as the heat-sealing layer. The inner layer B is composed of a light-shielding thermoplastic resin film layer 6a, a metal foil layer 5, a bleached kraft paper 18 and another light-shielding thermoplastic resin film layer 6a containing synthetic rubber laminated in that order to each other through adhesive layers 4. In the double-sheet gusset bag, since moistureproofness cannot be attained by heat sealing alone, the bottom sealed portion is turned and further sealed by fixing the turned portion using a hot-melt adhesive.

However, since the above conventional double-sheet gusset bag was made by combining two packaging materials of the outer sheet and the inner sheet in a dark room, workability was difficult and the center seal portion deviated from one bag to another. Moreover, the packaging cost was expensive.

SUMMARY OF THE INVENTION

An object of the invention is to provide a gusset bag for photographic photosensitive materials, which exhibits excellent workability in a dark room.

Another object of the invention is to provide a gusset bag for photographic photosensitive materials capable of reducing packaging cost.

The inventor has completed several packaging materials comprising a laminated sheet having a light-shielding thermoplastic resin film layer preferably composed of polyolefin resin such as L-LDPE resin as a heat-sealing layer and a heat-resistant flexible sheet layer having a melting point higher than that of the heat-sealing layer disposed as the topmost layer. The packaging materials are excellent in heat sealability and physical strength. Some embodiments of such a packaging material are illustrated in FIGS. 5 to 10.

The packaging material of FIG. 5 is composed of a light-shielding polyolefin resin film layer 3*a*, a metallized flexible sheet layer IIM consisting of a metal membrane layer M and a flexible sheet layer 2 represented by aluminum vacuum-metallized biaxially stretched thermoplastic resin film layer composed of polyester resin, polyamide resin, polypropylene resin, high density polyethylene resin or the like, and a heat-resistant flexible sheet layer 1 laminated in this order to each other through adhesive layers 4.

The packaging material of FIG. 6 is the same as the packaging material of FIG. 5, except that the metallized flexible sheet layer IIM is replaced by a metal foil layer 5.

The packaging material of FIG. 7 is the same as the packaging material of FIG. 5, except that the light-shielding polyolefin resin film layer 3*a* is replaced by a light-shielding coextruded multilayer polyolefin resin film layer IIIa consisting of a light-shielding thermoplastic resin film layer 6*a* and a light-shielding polyolefin resin film layer 3*a*.

The packaging material of FIG. 8 is the same as the packaging material of FIG. 5, except that the light-shielding polyolefin resin film layer 3*a* is replaced by a light-shielding coextruded multilayer polyolefin resin film layer IIIa consisting of two light-shielding polyolefin resin film layers 3*a*, 3*a* of which the resin composition may be identical with or different from each other.

The packaging material of FIG. 9 is the same as the packaging material of FIG. 5, except that the light-shielding polyolefin resin film layer 3*a* is replaced by a light-shielding coextruded multilayer polyolefin resin film layer IIIa consisting of a thermoplastic resin film layer 6 and a light-shielding polyolefin resin film layer 3a.

The packaging material of FIG. 10 is composed of a light-shielding coextruded multilayer film layer IIIa consisting of light-shielding polyolefin resin film layer 3*a* and a heat-resistant flexible sheet layer 1.

In order to achieve the aforementioned objects, the inventors have tried to make single-sheet gusset bag using such a packaging material. However, fogging occurred in the photographic photosensitive material packaged therein. Particularly, in the case of a roll of photographic photosensitive strip material wherein the light-sensitive layer was disposed on the outside, not only fogging but uneven gloss occurred. Therefore, the inventors have further investigated, and they found that these troubles occurred due to the heat of the hot-melt adhesive. That is, the photographic photosensitive material was packaged during the bag-making, operation in the plant. When the bottom seal portion was fixed by the hot-melt adhesive, the photographic photosensitive material was adversely affected by the heat of the hot-melt adhesive. In particular fogging was caused by the heat, and the uneven gloss was caused by the softening of the polyethylene resin layer or a similar layer coated on the support. They found that the troubles occurred because the heat conductivity of the single-sheet gusset bag was higher than the conventional double-sheet gusset bag.

The elevation of the inside temperature was estimated as to the single-sheet gusset bag and the double-sheet gusset bag at the time of coating a hot-melt adhesive by measurement under certain conditions. FIG. 12 indicates the temperature variation of the face to be disposed on the inside of packaging material use for the single-sheet gusset bag, when the other face to be disposed on the outside was heated. FIG. 13 indicates the temperature variation of the packaging material used for the double-sheet gusset bag.

| | |
|---|---|
| Construction of the single-sheet gusset bag | Illustrated in FIG. 7 |
| Construction of the double-sheet gusset bag | Illustrated in FIG. 11 |
| Temperature of heating block | 50° C. |
| Chart speed | 60 mm/min. |
| Room temperature | 20° C. |
| Humidity | 65% |
| Measuring method | |

The heating block was contacted with each test piece of the packaging material of FIG. 7 or FIG. 11 having a size of 100 mm×100 mm, and the temperature variation of the opposite face was measured by using a thermocouple. When temperature of the opposite face reached 50° C., the heating block was removed.

As can be seen from the drawings, the heat conductivity of the packaging material of the single-sheet gusset bag is about twice as much as that of the double-sheet gusset bag.

In order to prevent the fogging by the hat of the hot-melt adhesive, they tried to decrease or eliminate the coating of the hot-melt adhesive in the portion of the seal touching the roll of the photographic photosensitive material, to use low viscosity hot-melt adhesive at a low temperature, to use low temperature adhesive of latex or solution-type, and to use an adhesive tape as disclosed in Japanese Patent KOKAI No. 5757/1981. However, in the case of the first means, the adhesive strength was insufficient, and in the case of the second means, adhesive strength was insufficient, and the setting time and open time were excessive. In the case of the third means, the setting time was long, and in the case of the fourth means, the workability was inferior and the equipment cost was high.

Thus, the inventors have further investigated, and the fixing means of the bottom seal portion having a sufficient adhesive strength and not yielding adverse affects upon the rolled photographic photosensitive material have been achieved by using the hot-melt adhesive having a low softening point to the degree not to lengthen the setting time and by sealing the bottom seal portion so that the portion touching the rolled photographic photosensitive material is coated with less than a prescribed amount of the hot-melt adhesive.

The gusset bag for photographic photosensitive materials is formed of a single sheet, and is characterized by comprising a laminated sheet of which the inner surface layer is a light-shielding polyolefin resin film layer and the outer surface layer is a heat-resistant flexible sheet layer, and having a bottom seal portion fixed by a hot-melt adhesive having a softening point determined by ring and ball method of 75° to 115° C. of which the coating amount in the center portion is less than the coating amount of the side portion.

DETAILED DESCRIPTION OF THE INVENTION

Figure 1:
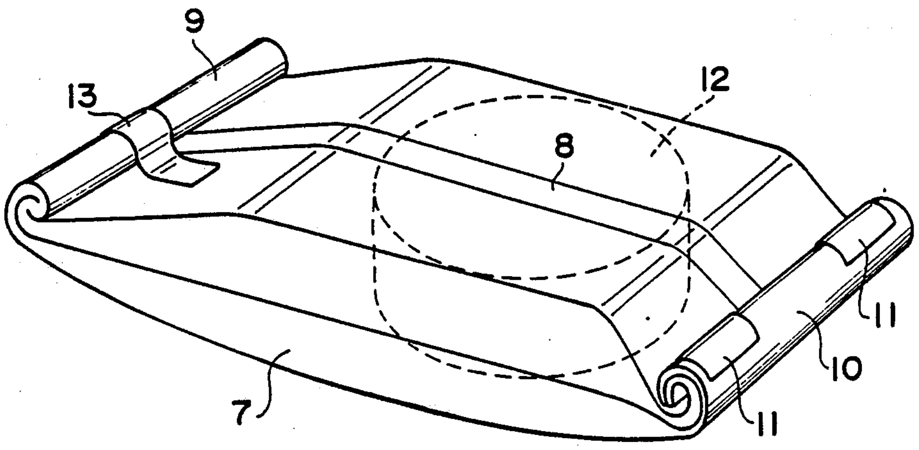
FIG. 1 is a perspective view of a gusset bag of the invention indicating the state that the hot-melt adhesive is applied on the bottom seal portion.

The gusset bag of the invention comprises a laminated sheet of which the inner surface layer is a light-shielding polyolefin resin film layer and the outer surface layer is a heat-resistant flexible sheet layer.

The light-shielding polyolefin resin film layer is preferably composed of linear low density polyethylene (L-LDPE) resin excellent in heat sealability, physical strength, etc. The L-LDPE resin is a copolymer of ethylene and $\alpha$-olefin and it has a linear structure having short branches. The number of carbon atoms of the $\alpha$-olefin is 3–13, preferably 4–10, and examples are butene-1, 4-methylpentene-1, hexene-1 and octene-1. Preferable $\alpha$-olefins are 4-methylpentene-1, hexene-1, heptene-1 and octene-1. The density is usually in the range of 0.87–0.95 g/cm$^3$, preferably 0.87–0.94 g/cm$^3$ (ASTM D-1505), and the melt index (M.I.) is preferably 0.8–30 g/10 minutes (ASTM D-1238). Such a L-LDPE resin is manufactured by solution method, slurry method, vapor phase method, or modified high pressure method. Examples of L-LDPE resin are "G-RESIN", "NUC-FLX" and "TUFLIN" (trade name, UCC), "NUC POLYETHYLENE-LL" and "TUFTHENE" (trade name, Nippon Unicar Co., Ltd.), "DOWLEX" (trade name, Dow Chemical Co., Ltd.), "MITSUBISHI POLYETHYLENE-LL" (trade name, Mitsubishi Petrochemical Co., Ltd.), "STAMILEX" (trade name, DSM), "SUCLEAR" (trade name, Dupont de Nemour, Canada), "MARLEX" (trade name, Phillips Co., Ltd.), "ULTZEX" and "NEOZEX" (trade name, Mitsui Petroleum Chemical Industries Co., Ltd.), "IDEMITSU POLYETHYLENE-L" and "MORETEC" (trade name, Idemitsu Petrochemical Co., Ltd.) and "NISSEKI LINIREX" (trade name, Nippon Petrochemicals Co., Ltd.). The contact of L-LDPE resin in this film layer is more than 10 wt. % in order to improve the sealability and sealing property, preferably more than 30 wt. %, further preferably more than 50 wt. % in order to improve physical strength. The L-LDPE resin is superior in strength, but it is inferior in that it is difficult to process. By blending other resins, such as LDPE resin to HDPE resin, the problem of processing is improved, and furthermore, tear strength, heat seal strength and Gelbo test strength are remarkably raised. The upper limit of the content is 99.9 wt. % or less, and it is different according to the kind of the blended resin, etc.

As the resin to be blended with L-LDPE resin, polyolefin resins, such as homopolypropylene resin, propylene-ethylene random copolymer resin, propylene-ethylene block copolymer resin, LDPE resin, HDPE resin, EVA resin, EEA resin, EAA resin, polyisobutylene resin, etc. can be blended to the extent so far as its fundamental characteristics are not changed. Preferable polyolefin resins include ethylene copolymer resins.

A light-shielding material is blended in order to impart light-shielding ability to the light-shielding polyolefin resin film layer. A preferred light-shielding material is carbon black. Suitable content of carbon black is in the range of 0.1 to 15 wt. %, and the range of 3 to 7 wt. % is particularly preferable. Oil furnace carbon black is preferable in terms of light-shielding character, cost, improvement of properties and the security of photographic properties such as fogging and sensitivity variation. On the other hand, since acetylene black and Ketschen carbon black have antistatic characteristics, they are also preferable, though they are expensive. They may be blended with the oil furnace black in order to improve its characteristics. Suitable pH of carbon black is at 5 to 9, particularly at 6 to 8, and suitable mean particle size is 10 to 120 mμ. Particularly, the oil furnace carbon black having pH 6 to 9 and mean particle size of 15 to 50 mμ are preferable. By using the carbon black of such pH and particle size, a gusset bag having significant advantage is obtained. More particularly, the occurrence of fogging is rare, the increase or decrease of photosensitivity rarely occurs, the light-shielding ability is large, and the lumps of carbon black and pinholes such as fish eye are hardly generated. In the gusset bag of the invention, carbon black is blended into the light-shielding polyolefin resin film layer touching the photosensitive materials to be packaged. By this location, the carbon black effectively shields light, it prevents the occurrence of blocking, it provides slipping characteristics, and it exhibits antistatic properties.

The antioxidant is preferably added in order to inhibit the generation of lumps caused by thermal degradation of the resin. This antioxidant may be phenol antioxidant, a sulfur-containing antioxidant or a phosphorus-containing antioxidant. The phenol antioxidants include n-octadecyl-3-(3',5'-di-t-butyl-4'-hydroxyphenyl)propionate, 2,6-di-t-butyl-4-methylphenol, 2,6-ti-t-butyl-p-cresol, 2,2'-methylenebis(4-methyl-6-t-butylphenol), 4,4'-thiobis (3-methyl-6-t-butylphenol), 4,4'-butylidenebis (3-methyl-6-t-butylphenol), stearyl-β-(3,5-di-4-butyl-4-hydroxypenyl)propionate, 1,1,3-tris(2-methyl-4-hydroxy-5-t-butylphenyl)butane, 1,3,5-trimethyl-2,4,6-tris (3,5-di-t-butyl-4-hydroxybenzyl)benzene and tetrakis methylene-3-(3',5'-di-t-butyl-4'-hydroxyphenyl)propionate methane. The sulfur-containing antioxidants include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite. Particularly effective antioxidants are 2,6-di-t-butyl-p-cresol (BHT), low volatile high molecular weight phenol antioxidant ("Irganox 1010", "Irganox 1076", trade names of Ciba-Geiby AG, "Topanol CA", trade name of I.C.L., "Ionox 330" trade name of Shell). dilaurylthiodipropionate, distearylthiodipropionate and dialkylphosphate.

Two or more antioxidants may be combined. The content of the antioxidant is usually 0.001 to 1 wt. %. In the case where two or more antioxidants are added, the above content is total amount of them. When the content is less than 0.001 wt. %, the effect of blending does not appear. While, when the content is more than 1 wt. %, the photographic film placed in such a gusset bag is adversely influenced by the antioxidant. Accordingly, a lower content in the range capable of preventing the generation of lumps and coloring is preferable. When the resin of the polyolefin resin film layer contains one or more resins such as LDPE resin in addition to L-LDPE resin, the antioxidant may be blended with either or both of the L-LDPE resin and the other resin(s). Furthermore, the effects of the antioxidant synergistically appears by blending it with carbon black.

Various additives may be added to the polyolefin resin film layer. Examples of the additives are described below.

(1) Stabilizer; lead compounds, cadmium compounds, zinc compounds, alkaline earth metal compounds, organic tin compounds, etc.
(2) Antistatic agent; cationic surfactants, anionic surfactants, nonioinc surfactants, ampholytic surfactants, etc.
(3) Filler; alumina, kaolin, clay, calcium carbonate, mica, talc, titanium oxide, silica, etc.
(4) Reinforcing agent; glass lobing, metallic fiber, glass fiber, glass milled fiber, carbon fiber, etc.
(5) Coloring agent; inorganic pigments (Al, $Fe_2O_3$, $TiO_2$, Zno, CdS, etc.), organic pigments (carbon black, etc.), dyes, etc.
(6) Deterioration preventing agent; ultraviolet absorber, metal deactivator, peroxide decomposing agent, etc.
(7) Lubricant; paraffin wax, fatty acids, fatty acid amides, esters, higher alcohols, etc.
(8) Coupling agent; silane compounds, titanium compounds, chromium compounds, aluminum compounds, etc.
(9) Various thermoplastic resins, rubbers, etc.

The light-shielding polyolefin resin film layer may be composed of two or more layers such as formed by coextrusion or the pseudo-adhesion by blocking or the like.

The light-shielding polyolefin resin film layer may be coextruded together with another thermoplastic resin film layer to form a coextruded multilayer film layer consisting of two or more layers. Even in such a case, the light-shielding polyolefin resin film layer should be disposed as the inner surface layer which is the heat seal layer of the laminated sheet. The resin coextruded with the light-shielding polyolefin resin film layer may be polyethylene resin such as L-LDPE resin, LDPE resin, HDPE resin or MDPE resin, homopolypropylene resin, propylene-ethylene random copolymer resin, propylene-ethylene block copolymer resin, EVA resin, EEA resin, EAA resin, polyisobutylene resin, polyamide resin such as nylon 6, nylon 6-6 or nylon 12, saponified EVA resin, polybutene-1 resin, polyester resin, ionomer resin, polyvinylidene chloride resin, polyacrylonitrile resin, polystyrene resin, a modified resin of one of these resins, a graft copolymer resin containing one of these resins, a crosslinked resin or a blend of two or more of the above resins.

The thickness of the light-shielding polyolefin resin film layer is greater than 30 μm, usually 40 to 200 μm, particularly 50 to 150 μm. When this film layer is coextruded, its thickness is greater than 10 μm, preferably greater than 20 μm, and the total thickness of the coextruded layer is thicker than 20 μm, usually 40 to 200 μm, particularly 50 to 150 μm.

The heat-resistant flexible sheet layer may be selected from white glassine paper, various kraft papers, various uniaxially or biaxially molecularly oriented including uniaxially or biaxially stretched thermoplastic resin films, various metallized uniaxially or biaxially molecularly oriented films including uniaxially or biaxially stretched thermoplastic resin films, various plastic films, coated paper, lintfree paper, neutral paper, cellophane, neutral paper, synthetic pulp-blended paper, nonwoven fabric, resin saturated paper, synthetic paper, calendered paper, or the like. Preferable flexible sheets are white or transparent, such as white glassine paper, cellophane, various uniaxially or biaxially molecularly oriented thermoplastic resin films, various metallized uniaxially or biaxially molecularly oriented thermoplastic resin films, synthetic pulp-blended paper, surface sized paper, saturated paper, coated paper, supercalendered bleached kraft paper, lintfree paper, neutral paper, synthetic paper and nonwoven fabric, with the like, and bleached kraft paper being particularly preferable in view of heat resistance, printability and no adverse effects upon photographic photosensitive materials. The heat-resistant flexible sheet layer is disposed so as to become the outer surface of the gusset bag, and its thickness is usually about 5 to 200 μm. The heat-resistant flexible sheet layer has higher heat resistance than the light-shielding polyolefin resin film layer. That is, the melting point, or the decomposition point, in the case that the melting point is not present, is higher than the light-shielding polyolefin resin film layer by 5° C. or more, preferably by 10° C. or more, particularly preferably by 20° C. or more.

The gusset bag of the invention is a single-sheet gusset bag, and the bottom seal portion is fixed by a hot-melt adhesive having a softening point determined by ring and ball method of 75° to 115° C., preferably 80° to 105° C. When the softening point is lower than 75° C., the setting time and the open time are long. While, when the softening point is beyond 115° C., fogging and uneven gloss occur in the photographic photosensitive material. Such a hot-melt adhesive may be selected from polyethylene resin hot-melt adhesives, ethylene copolymer resin hot-melt adhesives, modified polyethylene resin hot-melt adhesives, polyamide resin hot-melt adhesives, polyester resin hot-melt adhesives, polyurethane resin hot-melt adhesives and the like. Two or more hot-melt adhesives may be combined. Particularly preferable hot-melt adhesives include the hot-melt adhesive in which the principal component is ethylene-vinyl acetate copolymer resin having a vinyl acetate unit content of less than 20 wt. %.

The hot-melt adhesive may be blended with various additives, such as resorcinol compounds, polystyrene block copolymer resins, resin and its derivatives, waxes, antioxidants and the like.

The coating amount of the hot-melt adhesive in the center portion of the gusset bag is less than the coating amount of the side portion. Since the rolled photographic photosensitive material is usually placed so that the cylindrical face is pointed towards the bottom, the rounded portion is the portion that touches or is close to the rolled photographic photosensitive material placed in the gusset bag. The center portion where the coating amount of the hot-melt adhesive should be decreased is preferably about 10 to 80, particularly 20 to 60%, of the total length of the bottom seal portion. Whereas, since both side portions are apart from the cylindrical face of the rolled photographic photosensitive material, the heat of the coated hot-melt adhesive does not or hardly exerts any adverse effects. Each side portion is about one fourth to about three eighths, particularly one third, of the total length of the bottom seal portion. The coating amount per unit length in the center portion is decreased to the extent where no fogging nor uneven gloss of the rolled photographic photosensitive material occurs. The extent is different according to the material and composition of the packaging material employed, the kind of the rolled photographic photosensitive material, the kind of the hot-melt adhesive, and the like. The coating amount in the center portion is preferably less than two thirds of the coating amount in each side portion. The center portion may be not coated with the hot-melt adhesive. The coating amount may be adjusted by the coating width, the coating length or the coating thickness.

The gusset bag of the invention is a single-sheet gusset bag, and it is made by the following process. First, the rolled photographic photosensitive material is wrapped by the square sheet of the aforementioned laminated sheet in cylindrical form so that the light-shielding polyolefin resin film layer is set on the inside, and both sides of the above laminated sheet are joined by back lining using a heat sealer or any other known sealing method for bag-making. The upper opening end of the cylinder is heat-sealed in the shape of claim line, and the bottom is completely sealed by side welding (heat cut sealing). The bottom portion is rolled, and the rolled end is fixed by the hot-melt adhesive to complete the bottom seal portion. The upper end is also rolled, and the end is fixed by an adhesive tape to complete the top seal portion. Thus, packaging process is finished. In the case of conventional double-sheet gusset bag, both ends must be rolled in order to secure a sufficient seal. Whereas, in the case of the gusset bag of the invention, it is sufficient that both heat-sealed ends are merely turned and the faces opposite to each other are joined by an adhesive. Various other known sealing methods for bag-making are also utilizable instead of heat sealing.

In the gusset bag of the invention, the bottom seal portion can be completely sealed without the fogging and uneven gloss due to the heat of hot-melt adhesive. Since the gusset bag is formed of a single sheet, packaging workability is facilitated. The cost of the packaging material is inexpensive.

The photographic photosensitive material particularly suitable for the gusset bag of the invention include a revolute roll of photographic photosensitive material where the photosensitive layer is disposed on the outside, a roll of photographic printing paper where the photographic emulsion layer is coated on the support of which both faces are coated with thermoplastic resin, and a roll of a photographic photosensitive material where a sensitizing dye is added.

EXAMPLES

Figure 2:
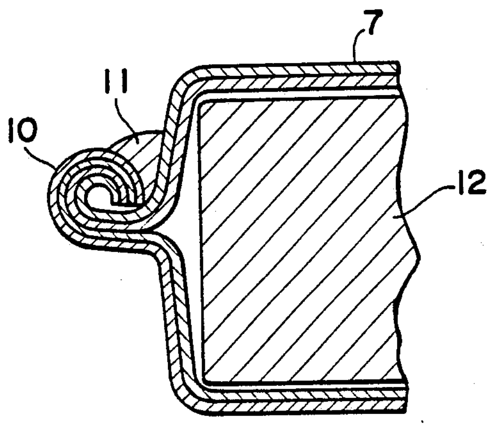
FIG. 2 is a partially sectional view thereof indicating the state that the bottom seal portion is fixed by further rolling up.

An example of the gusset bag of the invention is illustrated in FIG. 1. As shown in the drawing, both sides of the laminated sheet 7 are joined by back lining using a heat sealer to form center seal portion 8. Both ends are heat-sealed and rolled to form top seal portion 9 and bottom seal portion 10. The heat seal of top seal portion 9 is dotted line so that air in the bag can be deflated, and the rolled end is fixed by adhesive tape 13 so that rolled photographic photosensitive material 12 can be taken out readily in a dark room. The heat seal of bottom seal portion 10 is a band-shaped complete seal, and hot-melt adhesive 11 is coated on both side portions of the half rolled bottom end in band shape. The coated length of each hot-melt adhesive is about one fourth of the total length of the bottom seal portion, and both of the coated positions are placed in the range of one third of the total length of the bottom seal portion from each side edge of the gusset bag. Whereas, the hot-melt adhesive is not coated in the center portion to touch or to be close to the rolled photographic photosensitive material 12. The bottom end was further rolled, and fixed by the hot-melt adhesive 11 as shown in FIG. 2.

Figure 3:
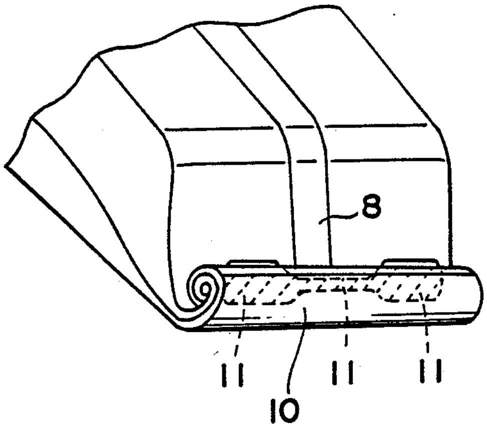
FIG. 3 is a partial perspective view of the bottom seal portion which has already been fixed in accordance with a bag of the invention.

Another example of the gusset bag of the invention is shown in FIG. 3. In this example, the hot-melt adhesive 11 is also coated on the center portion of the bottom seal portion 10, and the coated amount (width) in the center portion is less than a half amount in the side portion.

Figure 4:
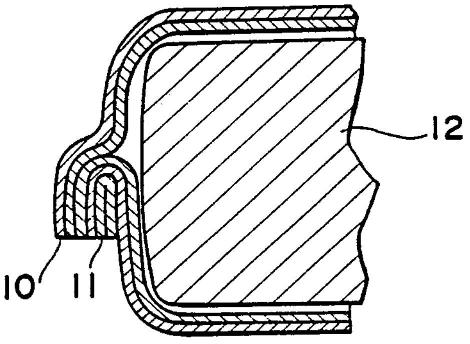
FIG. 4 is a partial sectional view of the bottom seal portion of another gusset bag of the invention where the bottom seal portion is fixed by turning instead of rolling up.
Figure 5:
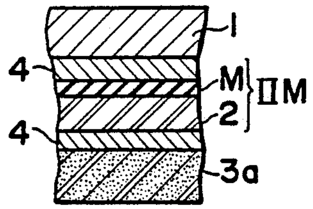
FIGS. 5 to 10 are partial sectional views of several laminated sheets which may be used in the gusset bag of the invention.
Figure 6:
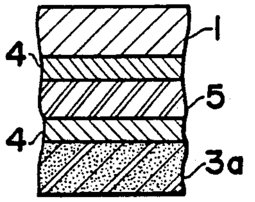

Another example of the gusset bag of the invention is shown in FIG. 4. In this example, the hot-melt adhesive 11 is coated on both side portions of the bottom end which is not rolled. Then, the bottom end is turned toward the coated side, and joined by the hot-melt adhesive 11 to form the bottom seal portion 10.

Various properties of the following gusset bags of the invention are compared with comparative gusset bags, and the results are summarized in Table 1.

Figure 7:
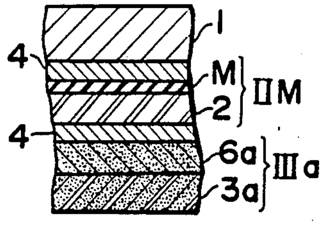
Figure 8:
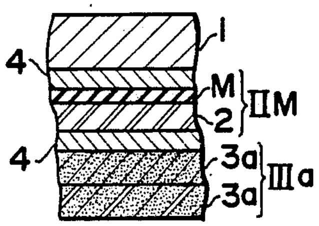
Figure 9:
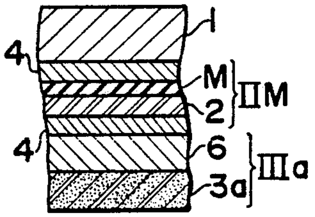
Figure 10:
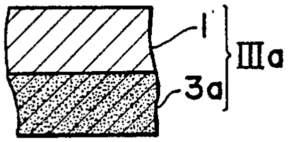
Figure 11:
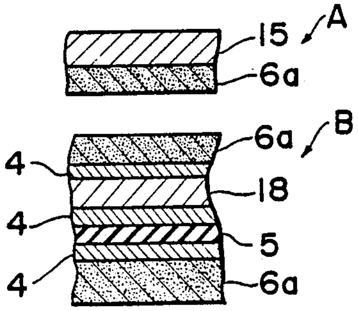
FIG. 11 is a partial sectional view of a double-sheet used for the conventional gusset bag.
Figure 12:
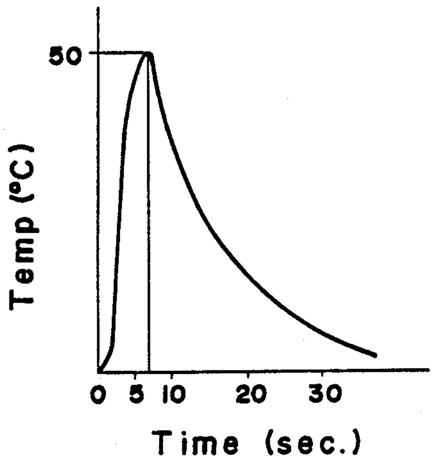
FIG. 12 is a graph indicating the heat conductivity of a packaging material used for the gusset bag of the invention.
Figure 13:
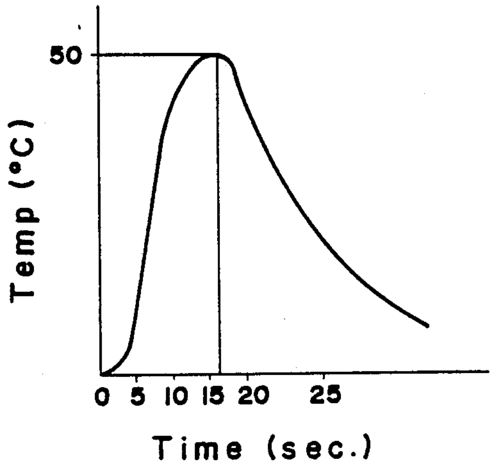
FIG. 13 PRIOR ART
FIG. 13 is a graph indicating the heat conductivity of the packaging material used for the conventional gusset bag.

The gusset bag of the invention I was formed of the packaging material of FIG. 7, and made in the form of FIG. 1. The heat-resistant flexible sheet layer 1 was bleached kraft paper having an areal weight of 35 g/m$^2$, and the metallized flexible sheet layer IIM was aluminum vacuum-metallized biaxially stretched nylon film layer composed of aluminum membrane layer M 400A thick and a biaxially stretched nylon film layer 2 having a thickness of 15 μm. The light-shielding polyolefin resin film layer **3*a* was composed of 91.62 wt. % of L-LDPE resin which was a copolymer of ethylene and 4-methylpentene-1, 5.0 wt. % of LDPE resin, 3.0 wt. % of oil furnace carbon black, 0.1 wt. % of talc having a mean particle size of 4.3 μm, 0.1 wt. % of silicon dioxide having a mean particle size of 3.0 μm, 0.13 wt. % of a phenol antioxidant and 0.05 wt. % of oleic acid amide lubricant, and its thickness was 40 μm. The light-shielding thermoplastic resin film layer 6*a* was composed of 71.85 wt. % of L-LDPE resin which was a copolymer of ethylene and 4-methylpentene-1, 20 wt. % of HDPE resin having a density of 0.954 g/cm$^3$, 5 wt. % of LDPE resin, 3.0 wt. % of oil furnace carbon black, 0.1 wt. % of a phenol antioxidant, and 0.05 wt. % of oleic acid amide lubricant, and its thickness was 40 μm. Both adhesive layers 4 were the same, and composed of 70 wt. % of L-LDPE resin which was a copolymer of ethylene and butene-1 and 30 wt. % of LDPE resin, having a thickness of 15 μm. Using the above packaging material a single-sheet gusset bag shown FIG. 1 was made. The principal component of the hot-melt adhesive 11 was EVA resin having a vinyl acetate unit content of 8 wt. %, and its softening point was 110 C. The rolled photographic photosensitive material 12** packaged therein was a roll of a color photographic printing paper composed of a resin-coated paper having sharp edges of which both face were coated with polyolefin resin and a photographic emulsion layer coated thereon, having 89 mm in width and 240 m in length.

The gusset bag of the invention II was the same as the gusset bag of the invention I, except that the hot-melt adhesive contained EVA resin having a vinyl acetate unit content of 15 wt. % and its softening point was 96 C, and that the center portion of the bottom seal portion 10 was coated with one third of the coated amount of the side portion, as shown in FIG. 3.

Comparative gusset bag I was the same as the gusset bag of the invention I, except that the center portion of the bottom seal portion 10 was coated with the hot-melt adhesive in the same amount as the side portion, similar to a conventional gusset bag.

Comparative gusset bag II was the same as the gusset bag of the invention I, except that the hot-melt adhesive contained EVA resin having a vinyl acetate unit content of 27 wt. % and had a softening point of 69° C.

TABLE 1

| | Invention | | Comparative | |
|---|---|---|---|---|
| | I | II | I | II |
| Layer Composition | FIG. 7 | FIG. 7 | FIG. 7 | FIG. 7 |
| Bottom Seal Portion | FIG. 2 | FIG. 2 | FIG. 2 | FIG. 2 |
| Hot-Melt Adhesive | FIG. 1 | FIG. 3 | Conventional | FIG. 3 |
| Hot-Melt Resin | EVA | EVA | EVA | EVA |
| Hot-Melt VA Content (wt. %) | 8 | 15 | 8 | 27 |
| Hot-Melt Softening Point(°C.) | 110 | 96 | 110 | 69 |
| Hot-Melt Coating Temp.(°C.) | 135 | 120 | 135 | 110 |
| Setting Time (sec.) | B 1–2 | B 1–2 | B 1–2 | E 4–5 |
| Open Time (sec.) | B 3–4 | B 3–4 | C 5–6 | E 17–18 |
| Bag-Making Ability | B | B | C | E |
| Fogging by Heat | B | B | E | B |
| Uneven Gloss | B | B | D | B |
| Fixation Strength of Bottom seal Portion | B | B | A | D |

Evaluations in Table 1 were carried out as follows:

| | | | |
|---|---|---|---|
| A | very excellent | B | excellent |
| C | practical | D | having a problem |
| E | impractical | | |

Testing methods are as follows: Softening Point: Ring and Ball Method (according to JIS K 2207)

Coating Temperature: Measured by a thermistor Setting Time:

The time necessary to solidify the bonding portion of the hot-melt adhesive so that the bonding portion resists usual handling and machining.

Open Time:

The hot-melt adhesive was coated, and the coated face was left to be opened. The open time is the time necessary to have a moderate viscosity (unmoved state) by cooling. Open time is also called open assembly time.

Bag-Making Ability:

Estimated by the surface-reverse side judging ability, workability for automatic bag-making, heat seal ability, occurrence of pinhole, etc. at the time of packaging the roll of color photographic printing paper in each gusset bag under safety light in a dark room.

Fogging by Heat:

After packaging, the two outer winds of the roll of the color photographic printing paper were developed, fixed, washed with water and then dried in a room. The fogging was estimated by visual observation.

Fixation Strength of Bottom Seal Portion:

The bottom seal portion was fixed by the hot-melt adhesive, and allowed to stand for 5 hours at room temperature. The fixation strength was judged by the force necessary to separated the portion bonded by the hot-melt adhesive.

We claim:

1. A single-sheet gusset bag of laminate construction for photographic photosensitive materials comprising a laminated sheet of which the inner surface layer is a light-shielding polyolefin resin film layer and the outer surface layer is a heat-resistant flexible sheet layer, and having a bottom seal portion fixed by a hot-melt adhesive having a softening point determined by ring and ball method of 75 to 115 C of which the coating amount of the hot melt adhesive in the center portion of the bottom seal portion of said gusset bag is less than the coating amount of the side portion of the bottom seal portion of said gusset bag.

2. The gusset bag of claim 1 wherein the light-shielding polyolefin resin film layer contains more than 10 wt. % of linear low density polyethylene resin.

3. The gusset bag of claim 1 wherein said coating amount in the center portion is less than a half of the coating amount of side portion.

* * * * *